(12) United States Patent
Grossman et al.

(10) Patent No.: US 11,507,039 B2
(45) Date of Patent: Nov. 22, 2022

(54) TECHNIQUES FOR ON-BODY FABRICATION OF WEARABLE OBJECTS

(71) Applicant: AUTODESK, INC., San Francisco, CA (US)

(72) Inventors: Tovi Grossman, Toronto (CA); George Fitzmaurice, Toronto (CA); Madeline Gannon, Pittsburgh, PA (US)

(73) Assignee: AUTODESK, INC., San Francisco, CA (US)

( * ) Notice: Subject to any disclaimer, the term of this patent is extended or adjusted under 35 U.S.C. 154(b) by 779 days.

(21) Appl. No.: 15/406,620

(22) Filed: Jan. 13, 2017

(65) Prior Publication Data
US 2017/0204541 A1   Jul. 20, 2017

Related U.S. Application Data

(60) Provisional application No. 62/279,607, filed on Jan. 15, 2016.

(51) Int. Cl.
*G05B 19/00* (2006.01)
*B29C 64/393* (2017.01)
*B29C 64/106* (2017.01)

(52) U.S. Cl.
CPC ............ *G05B 19/00* (2013.01); *B29C 64/393* (2017.08); *B29C 64/106* (2017.08)

(58) Field of Classification Search
CPC ...... G05B 19/00; B29C 64/393; B29C 64/106
See application file for complete search history.

(56) References Cited

U.S. PATENT DOCUMENTS

| 6,424,877 | B1 * | 7/2002 | Kondo ............... | G05B 19/4207 345/649 |
| 8,286,236 | B2 * | 10/2012 | Jung ...................... | G06Q 10/06 726/21 |
| 8,427,434 | B1 * | 4/2013 | Merolla .................. | G06T 15/20 178/18.01 |

(Continued)

OTHER PUBLICATIONS

Martin Bechthold, Jonathan King, Anthony Kane, Jeffrey Niemasz, Christoph Reinhart. Integrated Environmental Design And Robotic Fabrication Workflow For Ceramic Shading Systems. In Proceedings of the 28th ISARC (ISARC 11), Seoul, Korea, 70-75.

(Continued)

*Primary Examiner* — Chad G Erdman
(74) *Attorney, Agent, or Firm* — Artegis Law Group, LLP

(57) ABSTRACT

In various embodiments, a wearable object engine generates wearable objects. The wearable object engine represents a digital design of a wearable object as toolpaths. In operation, the wearable object engine generates visual guidance that indicates a portion of the design based on the toolpaths, a configuration associated a nozzle of a fabrication device, and a configuration associated with a portion of a human body. The wearable object engine causes the visual guidance to be displayed on the portion of the human body. As the nozzle moves over the portion of the human body, the nozzle extrudes fabrication material that forms the portion of the wearable object directly on the portion of the human body. Advantageously, a designer may control the nozzle to fabricate the wearable object while receiving visual guidance based on the digital design.

17 Claims, 5 Drawing Sheets

(56) References Cited

U.S. PATENT DOCUMENTS

| | | | | |
|---|---|---|---|---|
| 2004/0264640 | A1* | 12/2004 | Myles | G16H 50/50 378/65 |
| 2008/0247637 | A1* | 10/2008 | Gildenberg | A61B 34/30 901/41 |
| 2012/0040314 | A1* | 2/2012 | Rubino, Jr. | G06Q 30/02 434/81 |
| 2012/0219699 | A1* | 8/2012 | Pettersson | G01B 11/002 427/8 |
| 2012/0323247 | A1* | 12/2012 | Bettenga | A61B 90/06 606/91 |
| 2014/0088750 | A1* | 3/2014 | Sharma | B33Y 50/00 700/118 |
| 2015/0057622 | A1* | 2/2015 | Hyde | A61M 35/00 604/290 |
| 2016/0000518 | A1* | 1/2016 | Thoranaghatte | G06F 3/04815 703/11 |
| 2016/0063613 | A1* | 3/2016 | Zhao | G06Q 30/0643 705/27.2 |
| 2016/0075087 | A1* | 3/2016 | Manners | B29C 64/106 700/98 |
| 2016/0075089 | A1* | 3/2016 | Duro Royo | B29C 64/386 264/308 |
| 2016/0106516 | A1* | 4/2016 | Mesallum | A61M 37/0076 606/130 |
| 2016/0179064 | A1* | 6/2016 | Arthur | G05B 15/02 700/98 |

OTHER PUBLICATIONS

Liwei Chan, Rong-Hao Liang, Ming-Chang Tsai, Kai-Yin Cheng, Chao-Huai Su, Mike Y. Chen, Wen-Huang Cheng, and Bing-Yu Chen. 2013. FingerPad: private and subtle interaction using fingertips. In Proceedings of the 26th annual ACM symposium on User interface software and technology (UIST '13). ACM, New York, NY, USA, 255-260. DOI=10.1145/2501988.2502016.

Ke-Yu Chen, Kent Lyons, Sean White, and Shwetak Patel. 2013. uTrack: 3D input using two magnetic sensors. In Proceedings of the 26th annual ACM symposium on User interface software and technology (UIST '13). ACM, New York, NY, USA, 237-244. DOI=10.1145/2501988.2502035.

Laura Devendorf and Kimiko Ryokai. 2015. Being the Machine: Reconfiguring Agency and Control in Hybrid Fabrication. In Proceedings of the 33rd Annual ACM Conference on Human Factors in Computing Systems (CHI '15). ACM, New York, NY, USA, 2477-2486. http://doi.acm.org/10.1145/2702123.2702547.

Madeline Gannon, Tovi Grossman, and George Fitzmaurice. 2015. Tactum: A Skin-Centric Approach to Digital Design and Fabrication. In Proceedings of the 33rd Annual ACM Conference on Human Factors in Computing Systems (CHI 15). ACM, New York, NY, USA, 1779-1788. http://doi.acm.org/10.1145/2702123.2702581.

Sean Gustafson, Christian Holz, and Patrick Baudisch. 2011. Imaginary phone: learning imaginary interfaces by transferring spatial memory from a familiar device. In Proceedings of the 24th annual ACM symposium on User interface software and technology (UIST '11). ACM, New York, NY, USA, 283-292. DOI=10.1145/2047196.2047233.

Brian Harms. Buoyant Depositions. Retrieved Sep. 2015. https://vimeo.com/65179063.

Chris Harrison, Desney Tan, and Dan Morris. 2010. Skinput: appropriating the body as an input surface. In Proceedings of the SIGCHI Conference on Human Factors in Computing Systems (CHI '10). ACM, New York, NY, USA, 453-462. DOI=10.1145/1753326.1753394.

Chris Harrison, Hrvoje Benko, and Andrew D. Wilson. 2011. OmniTouch: wearable multitouch interaction everywhere. In Proceedings of the 24th annual ACM symposium on User interface software and technology (UIST '11). ACM, New York, NY, USA, 441-450. http://doi.acm.org/10.1145/2047196.2047255.

Christian Holz, Tovi Grossman, George Fitzmaurice, and Anne Agur. 2012. Implanted user interfaces. In Proceedings of the SIGCHI Conference on Human Factors in Computing Systems (CHI '12). ACM, New York, NY, USA, 503-512. DOI=10.1145/2207676.2207745 http://doi.acm.org/101145/2207676.2207745.

Gierad Laput, Robert Xiao, Xiang 'Anthony' Chen, Scott E. Hudson, and Chris Harrison. 2014. Skin buttons: cheap, small, low-powered and clickable fixed-icon laser projectors. In Proceedings of the 27th annual ACM symposium on User interface software and technology (UIST '14). ACM, New York, NY, USA, 389-394. http://doi.acm.org/10.1145/2642918.2647356.

Shu-Yang Lin, Chao-Huai Su, Kai-Yin Cheng, Rong-Hao Liang, Tzu-Hao Kuo, and Bing-Yu Chen. 2011. Pub-point upon body: exploring eyes-free interaction and methods on an arm. In Proceedings of the 24th annual ACM symposium on User interface software and technology (UIST '11). ACM, New York, NY, USA, 481-488. DOI-10.1145/2047196.2047259.

Adiyan Mujibiya, Xiang Cao, Desney S. Tan, Dan Morris, Shwetak N. Patel, and Jun Rekimoto. 2013. The sound of touch: on-body touch and gesture sensing based on transdermal ultrasound propagation. In Proceedings of the 2013 ACM international conference on Interactive tabletops and surfaces (ITS '13). ACM, New York, NY, USA, 189-198. DOI=10.1145/2512349.2512821.

Stefanie Mueller, Pedro Lopes, and Patrick Baudisch. 2012. Interactive construction: interactive fabrication of functional mechanical devices. In Proceedings of the 25th annual ACM symposium on User interface software and technology (UIST '12). ACM, New York, NY, USA, 599-606. http://doi.acm.org/10.1145/2380116.2380191.

Neri Oxman, J. Laucks, M. Kayser, E. Tsai & M. Firstenberg. 2013. Freeform 3D Printing: toward a Sustainable Approach to Additive Manufacturing. In Green Design, Materials and Manufacturing Processes. Helena Bartolo et al. (eds.). CRC Press, Barcelona.

Huaishu Peng, Amit Zoran, and François V. Guimbretière. 2015. D-Coil: A Hands-on Approach to Digital 3D Models Design. In Proceedings of the 33rd Annual ACM Conference on Human Factors in Computing Systems (CHI '15). ACM, New York, NY, USA, 1807-1815. http://doi.acm.org/10.1145/2702123.2702381.

Alec Rivers, Andrew Adams, and Frédo Durand. 2012. Sculpting by numbers. ACM Trans. Graph.31, 6, Article 157 (Nov. 2012), 7 pages. http://doi.acm.org/10.1145/2366145.2366176.

Alec Rivers, Ilan E. Moyer, and Frédo Durand. 2012. Position-correcting tools for 2D digital fabrication. ACM Trans. Graph. 31, 4, Article 88 (Jul. 2012), 7 pages. http://doi.acm.org/10.1145/2185520.2185584.

Roy Shilkrot, Pattie Maes, Joseph A. Paradiso and Amit Zoran. 2015. "Augmented Airbrush for Computer Aided Painting (CAP)." ACM Trans. Graph. (TOG) 34, 2, Article 19, Mar. 2015, 11 pages.

Rajinder Sodhi, Hrvoje Benko, and Andrew Wilson. 2012. LightGuide: projected visualizations for hand movement guidance. In Proceedings of the SIGCHI Conference on Human Factors in Computing Systems (CHI '12). ACM, New York, NY, USA, 179-188. http://doi.acm.org/10.1145/2207676.2207702.

Alexander Teibrich, Stefanie Mueller, Francois Guimbretière, Robert Kovacs, Stefan Neubert, and Patrick Baudisch. Patching Physical Objects. 2015—in press. To appear in Proceedings of the ACM symposium on User interface software and technology.

Amy Wibowo, Daisuke Sakamoto, Jun Mitani, and Takeo Igarashi. 2012. DressUp: a 3D interface for clothing design with a physical mannequin. In Proceedings of the Sixth International Conference on Tangible, Embedded and Embodied Interaction (TEI '12), Stephen N. Spencer (Ed.). ACM, New York, NY, USA, 99-102. http://doi.acm.org/10.1145/2148131.2148153.

Xing-Dong Yang, Tovi Grossman, Daniel Wigdor, and George Fitzmaurice. 2012. Magic finger: always available input through finger instrumentation. In Proceedings of the 25th annual ACM symposium on User interface software and technology (UIST '12). ACM, New York, NY, USA, 147-156. DOI=10.1145/2380116.2380137.

Amit Zoran and Joseph A. Paradiso. 2013. FreeD: a freehand digital sculpting tool. In Proceedings of the SIGCHI Conference on Human Factors in Computing Systems (CHI '13). ACM, New York, NY, USA, 2613-2616. http://doi.acm.org/10.1145/2470654.2481361.

(56) References Cited

OTHER PUBLICATIONS

Amit Zoran. 2013. Hybrid basketry: interweaving digital practice within contemporary craft. In ACM SIGGRAPH 2013 Art Gallery (SIGGRAPH '13). ACM, New York, NY, USA, 324-331. http://doi.acm.org/10.1145/2503649.2503651.
Amit Zoran, Roy Shilkrot, Suranga Nanyakkara, and Joseph Paradiso. 2014. The Hybrid Artisans: A Case Study in Smart Tools. ACM Trans. Comput.-Hum. Interact. 21, 3, Article 15 (Jun. 2014), 29 pages. http://doi.acm.org/10.1145/2617570.

* cited by examiner

TECHNIQUES FOR ON-BODY FABRICATION OF WEARABLE OBJECTS

CROSS-REFERENCE TO RELATED APPLICATIONS

This application claims the priority benefit of the United States Provisional Patent application having Ser. No. 62/279,607 and filed on Jan. 15, 2016. The subject matter of this related application is hereby incorporated herein by reference.

BACKGROUND OF THE INVENTION

Field of the Invention

Embodiments of the present invention relate generally to computer science and, more specifically, to techniques for on-body fabrication of wearable objects.

Description of the Related Art

Oftentimes, highly trained designers handcraft wearable objects directly on a human body of a customer. For example, tailors create garments on models, tattoo artists inscribe graphic designs on skin, doctors customize prosthetics on patients, and so forth. The designer handcrafts each wearable object individually and, consequently, is able to exert complete artistic control over the wearable object. Further, the designer typically ensures that the wearable object meets design and artistic objectives. However, manually designing and fabricating similar wearable objects for multiple customers may be unacceptably time consuming.

To reduce the time required to design and/or fabricate multiple similar wearable objects, some designers may attempt to create digital models of wearable objects and then fabricate the wearable objects based on the digital models. In general, digital models may be easily adapted, archived, shared, and reproduced. For example, a designer could import, generate, modify, and/or export a digital model of a wearable object via computer automated design (CAD) tools. Subsequently, the designer could configure a Computer-Numeric Control (CNC) machine (e.g., a three-dimensional (3D) printer) to automatically fabricate the wearable object based on the digital model.

One limitation of automatically designing and fabricating wearable objects based on digital models is that existing automated tools are not amenable to designing and fabricating objects on human bodies. For example, many CNC machines add or remove material to produce final objects that are situated on a flat, stabilized build platform. By contrast, the human body is neither flat nor stable. Consequently, a designer is typically unable to fabricate wearable objects on a human body via CNC machines. If the designer is not able to design and/or fabricate a wearable object on a human body, then the designer may be unable to exert sufficient artistic control over the wearable object to ensure that the wearable object meets design and artistic objectives. Further, fabricating a wearable object directly on a customer typically provides a more direct and satisfying customer experience than fabricating a wearable object on an inanimate build platform.

As the foregoing illustrates, what is needed in the art are more effective techniques for designing and fabricating wearable objects.

SUMMARY OF THE INVENTION

One embodiment of the present invention sets forth a computer-implemented method for generating wearable objects. The method includes computing a toolpath based on a design of a wearable object; generating first visual guidance based on the toolpath, a first configuration associated with a nozzle, and a second configuration associated with a portion of a human body; and causing the first visual guidance to be displayed on the portion of the human body to indicate how to move the nozzle relative to the portion of the human body to fabricate at least a first portion of the wearable object.

One advantage of the disclosed techniques is that because the design of the wearable object is represented digitally, the design of the wearable object may be easily adapted, archived, shared, and reproduced. Reusing a design may dramatically reduce the time required to generate multiple similar wearable objects compared to the time required to generate the wearable objects via conventional, primarily handcrafted design and fabrication approaches. Further, because a designer interacts directly with the portion of the human body, the designer can exert complete artistic control over the wearable object.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
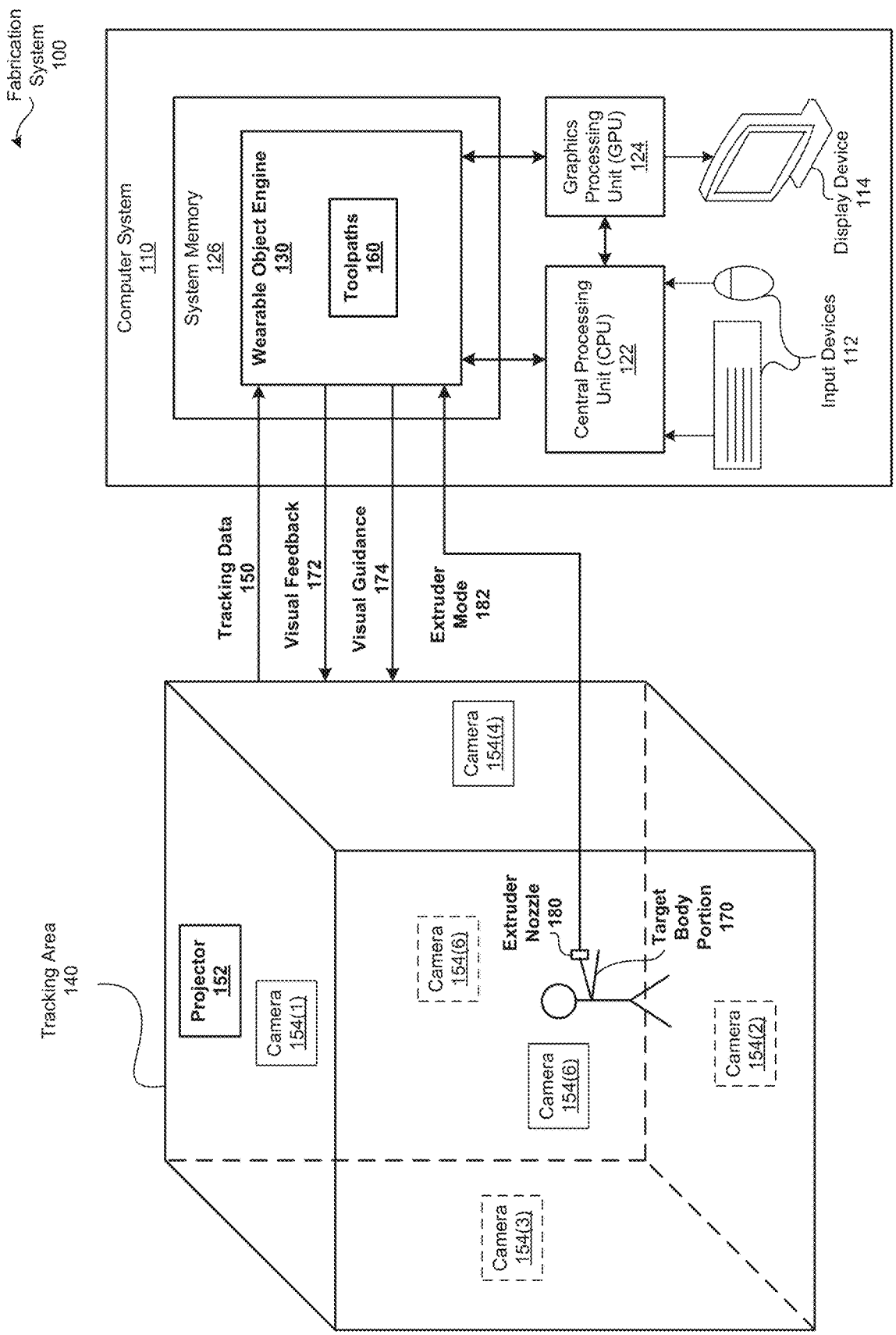
FIG. 1 is a conceptual illustration of a fabrication system configured to implement one or more aspects of the present invention.

FIG. 1 is a conceptual illustration of a fabrication system 100 configured to implement one or more aspects of the present invention. As shown, the fabrication system 100 includes, without limitation, a computer system 110, a target body portion 170, an extruder nozzle 180, and a tracking area 140. The target body portion 170 and the extruder nozzle 180 are inside the tracking area 140. For explanatory purposes, multiple instances of like objects are denoted with reference numbers identifying the object and parenthetical numbers identifying the instance where needed.

As shown, the computer system 110 includes, without limitation, a central processing unit (CPU) 122, input devices 112, a graphics processing unit (GPU) 124, a display device 114, and a system memory 126. The CPU 122 receives input from the input devices 112, such as a keyboard or a mouse. In operation, the CPU 122 is the master processor of the computer system 110, controlling and coordinating operations of other system components. In particular, the CPU 122 issues commands that control the operation of the GPU 124. The GPU 124 incorporates circuitry optimized for graphics and video processing, including, for example, video output circuitry. The GPU 124 delivers pixels to the display device 114 that may be any conventional cathode ray tube, liquid crystal display, light-emitting diode display, or the like.

In various embodiments, the GPU 124 may be integrated with one or more of other elements of FIG. 1 to form a single system. For example, the GPU 124 may be integrated with the CPU 122 and other connection circuitry on a single chip to form a system on chip (SoC). In alternate embodiments, the CPU 122 and/or the GPU 124 may be replaced with any number of processors. Each of the processors may be any instruction execution system, apparatus, or device capable of executing instructions. For example, a processor could comprise a digital signal processor (DSP), a controller, a microcontroller, a state machine, or any combination thereof.

It will be appreciated that the computer system 110 shown herein is illustrative and that variations and modifications are possible. The number of CPUs 122, the number of GPUs 124, the number of system memories 126, and the number of applications included in the system memory 126 may be modified as desired. Further, the connection topology between the various units in FIG. 1 may be modified as desired. In some embodiments, any combination of the CPU 122, the GPU 124, and the system memory 126 may be replaced with any type of distributed computer system or cloud computing environment, such as a public or a hybrid cloud. In some embodiments, the computer system 110 may not include the input devices 112 and/or the display device 114.

Designing and Fabricating Wearable Objects

As shown, the system memory 126 includes, without limitation, the wearable object engine 130. The wearable object engine 130 executes on the CPU 122 and/or the GPU 124 and automates the process of designing and fabricating wearable objects directly on the target body portion 170 via the extruder nozzle 180. Notably, unlike conventional handcrafted approaches to designing and fabricating wearable objects directly on portions of human bodies, the wearable object engine 130 represents the designs of wearable objects digitally. Representing the design of wearable object digitally facilitates adapting, archiving, sharing, and reproducing the design and, consequently, reduces the time required to produce multiple similar wearable objects compared to conventional handcrafted design and fabrication approaches.

More precisely, the wearable object engine 130 represents the design of a given wearable object as toolpaths 160. As persons skilled in the art will recognize, conventional "toolpaths" comprise lines that specify how a fabrication tool head moves across a volume of space to perform fabrication operations. In a conventional Computer-Numeric Control (CNC) designs flow, toolpaths specify how a CNC machine tool head moves across a flat, stabilized build platform. By contrast, the toolpaths 160 associated with a given wearable object specify how a tip of the extruder nozzle 180 would move relative to the target body portion 170 to generate the wearable object directly on the target body portion 170. Advantageously, the target body portion 170 may comprise any portion of any human body, and the target body portion 170 may move freely. The wearable object engine 130 may represent the toolpaths 160 in any technically feasible fashion. For instance, in some embodiments the wearable object engine 130 represents each of the toolpaths 160 as a series of spline curves.

The extruder nozzle 180 is a hand-held portion of a fabrication device. The extruder nozzle 180 may be configured to operate in different modes, and an extruder mode 182 specifies the current mode of the extruder nozzle 180. When the extruder mode 182 is equal to "input," the tip of the extruder nozzle 180 functions as a stylus. As a designer manipulates the tip of the extruder nozzle 180 on the target body portion 170, a motion tracking system (described in detail below) includes the motions of the extruder nozzle 180 and the target body portion 170 in tracking data 150. The wearable object engine 130 generates the toolpaths 160 based on the tracking data 150. Because the target body portion 170 and the extruder nozzle 180 may move independently, the wearable object engine 130 generates the toolpaths 160 relative to the target body portion 170.

As the wearable object engine 130 generates the toolpaths 160, the wearable object engine 130 generates visual feedback 172 based on the toolpaths 160. The wearable object engine 130 configures a projection system (described in detail below) to display the visual feedback 172 directly on the target body portion 170. The visual feedback 172 includes the portions of the toolpaths 160 that are visible to the designer and does not include the portions of the toolpaths 160 that are not visible to the designer. For example, if the toolpaths 160 encircled the target body portion 170, then portions of the toolpaths 160 would not be visible to the designer. Consequently, the visual feedback 172 would not include the complete toolpaths 160. Based on the visual feedback 172, the designer can sketch a design of a fabricated object on the target body portion 170 via the tip of the extruder nozzle 180 while visually monitoring the progress of the design.

By contrast, when the extruder mode 182 is equal to "output," the extruder nozzle 180 extrudes a single layer of fabrication material, and the wearable object engine 130 implements a neutral fabrication process that guides the designer, but controls neither the extruder nozzle 180 nor the fabrication material. More precisely, the wearable object engine 130 generates visual guidance 174 and configures the projection system to display the visual guidance 174 directly on the target body portion 170.

The visual guidance 174 includes, without limitation, portions of the toolpaths 160 that are visible to the designer and an indication of the location of the tip of the extruder nozzle 180 relative to the closest toolpath 160. Because the target body portion 170 and the extruder nozzle 180 may move independently, the wearable object engine 130 generates the visual guidance 174 relative to the target body portion 170. As the designer manipulates the extruder nozzle 180 on the target body portion 170 to trace the toolpaths 160 based on the visual guidance 174, the extruded fabrication material forms the wearable object.

The extruder nozzle 180 may be part of any fabrication device that is capable of selectively extruding fabrication material from a nozzle tip of the extruder nozzle 180 based on the extruder mode 182. When the extruder mode 182 is equal to "output," the nozzle tip extrudes fabrication material. When the extruder mode 182 is not equal to "output," the nozzle tip does not extrude fabrication material. The extruder mode 182 may be configured and/or transmitted to the wearable object engine 130 in any technically feasible fashion. For example, in some embodiments, the extruder nozzle 180 includes both an input button and an output button, and the extruder nozzle 180 transmits the settings of the input button and the output button to the wearable object engine 130.

To generate the toolpaths 160, the visual feedback 172, and the visual guidance 174 in the context of the target body portion 170 and the extruder nozzle 180, the wearable object engine 130 executes motion tracking operations and projection-mapping operations. The wearable object engine 130 executes motion tracking operations to determine the current position and orientation of the target body portion 170 and the current position and orientation of the extruder nozzle 180 based on the tracking data 150. In a complementary fashion, the wearable object engine 130 executes projection-mapping operations to generate the visual feedback 172 and the visual guidance 174 based on the current position and orientation of the target body portion 170.

As referred to herein, a "configuration" is synonymous with a "pose." Further, the configuration associated with the target body portion 170 is based on the location and orientation of the target body portion 170. Similarly, the configuration associated with the extruder nozzle 180 is based on the location and orientation of the extruder nozzle 180.

The tracking data 150 is generated by a motion tracking system that includes, without limitation, cameras 154 that are configured to observe the tracking area 140. As shown, the cameras 154(0)-154(6) are mounted, respectively, above, below, to the left, to the right, in front of, and behind the tracking area 140. The motion tracking system generates tracking data 150 based on the motion of the target body portion 170 and the extruder nozzle 180. More specifically, the cameras 154 tracks the motion of the target body 170 part via a target marker set (not shown in FIG. 1) that is worn on the target body portion 170, and the motion of the extruder nozzle 180 via an extruder marker set (not shown in FIG. 1) that is attached to the extruder nozzle 180.

In various embodiments, the motion tracking system may be implemented in any technically feasible fashion and may or may not include the cameras 154. Further, any portion of the human body associated with the target body portion 170 may be located within the tracking area 140 and the remaining portion of the human body 170 may be located outside the tracking area 140. For instance, if the target body portion 170 is the right arm, then the right arm is located inside the tracking area 140, and the right leg may or may not be located inside the tracking area 140.

The motion tracking system may generate and transmit the tracking data 150 in any technically feasible fashion. For example, in some embodiments, the motion tracking system comprises a six camera OptiTrack motion capture system that is configured to observe the tracking area 140. The target body portion 170 is an arm, and passive markers included in a target marker set that is attached to a wrist of the arm track the position and orientation of the arm. In a complementary fashion, passive markers attached to an extruder marker set that is attached to the extruder nozzle 180 track the position and orientation of the extruder 170. OptiTrack Arena motion capture software tracks the passive markers and generates the tracking data 150. The motion capture software then streams the tracking data 150 to the wearable object engine 130 based on the Open Sound Control protocol.

The projection system includes, without limitation, a projector 152 that is mounted above the tracking area 140 and is capable of projecting the visual feedback 172 and the visual guidance 174 onto the target body portion 170. The projector 152 may be any type of projector as known in the art. For example, the projector 152 could be a digital light processing (DLP) projector. In alternate embodiments, the projection system may include any number (including zero) of the projectors 152. For example, the projection system could include multiple projectors. Alternatively, the projection system could include an augmented reality device, such as a translucent screen or a head-mounted display, instead of the projector 152. The wearable object engine 130 may transmit the visual feedback 172 and the visual guidance 174 to the projector 152 in any technically feasible fashion.

Note that the techniques described herein are illustrative rather than restrictive, and may be altered without departing from the broader spirit and scope of the invention. Many modifications and variations on the functionality provided by the wearable object engine 130 and the extruder nozzle 180 will be apparent to those of ordinary skill in the art without departing from the scope and spirit of the described embodiments. In various embodiments, any number of the techniques may be implemented while other techniques may be omitted.

In alternate embodiments, the extruder nozzle 180 may or may not be hand-held and may or may not be controlled by a human. For example, the extruder nozzle 180 could be controlled in an automated fashion instead of based on direct human interactions with the extruder nozzle 180. In yet other alternate embodiments, the extruder nozzle 180 may be replaced by any type of device or any portion of any type of device that is capable of extruding fabrication material.

Alternate embodiments include any design application that generates any type of digital design data associated with a wearable object based on the movements of a fabrication tool over a portion of a human body. Other alternate embodiments include any fabrication application that projects any type of visual feedback or guidance directly on a portion of a human body based on any type of digital design data associated with a wearable object.

In alternate embodiments, the system memory 126 may not include the wearable object engine 130. In some embodiments, the wearable object engine 130 may be stored on computer readable media such as a CD-ROM, DVD-ROM, flash memory module, or other tangible storage media. Further, in some embodiments, the wearable object engine 130 may be provided as an application program (or programs) stored on computer readable media such as a CD-ROM, DVD-ROM, flash memory module, or other tangible storage media. In various embodiments, the functionality of the wearable object engine 130 is integrated into or distributed across any number (including one) of software applications.

The components illustrated in the computer system 110 may be included in any type of computer system 110, e.g., desktop computers, server computers, laptop computers, tablet computers, and the like. Additionally, the wearable object engine 130 may execute on distributed systems communicating over computer networks including local area networks or large, wide area networks, such as the Internet. The wearable object engine 130 described herein is not limited to any particular computing system and may be adapted to take advantage of new computing systems as they become available. In alternate embodiments, the functionality of the wearable object engine 130 may be implemented and provided in any technically feasible fashion. For instance, in some embodiments the functionality of the wearable object engine 130 may be provided as a cloud-based service.

Figure 2:
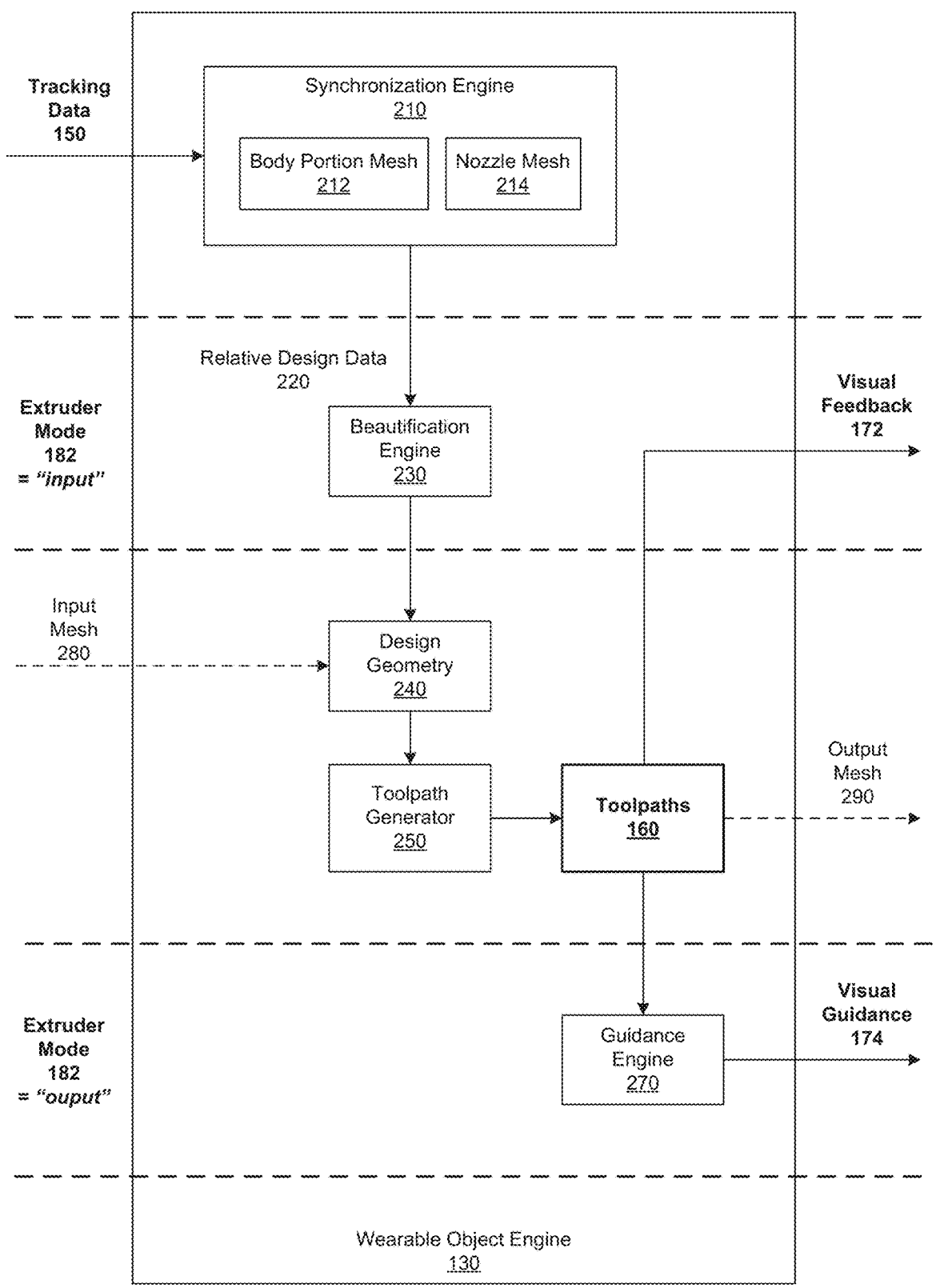
FIG. 2 is a more detailed illustration of the wearable object engine of FIG. 1, according to various embodiments of the present invention.

FIG. 2 is a more detailed illustration of the wearable object engine 130 of FIG. 1, according to various embodiments of the present invention. As shown, the wearable object engine 130 includes, without limitation, a synchronization engine 210, a beautification engine 230, design geometry 240, a tool path generator 250, the toolpaths 160, and a guidance engine 270. For exploratory purpose only, the target body portion 170 of a customer is inside the tracking area 140, and the projector 152 is capable of projecting images onto the target body portion 170. The designer manipulates the extruder nozzle 180 within the tracking area 140 in close proximity to the target body portion 170. In various embodiments, the designer may or may not be the same person as the customer.

First, as part of an initialization mode, the wearable object engine 130 performs calibration operations. More specifically, the wearable object engine 130 correlates projected two-dimensional (2D) points with tracked three-dimensional (3D) points to calibrate the projection system to the motion tracking system. Notably, the tracking data 150 includes three-dimensional points in "world" coordinates that are associated with the tracking area 140. By contrast, the toolpaths 160 include coordinates that are relative to the target body portion 170.

Also as part of the initialization mode, the synchronization engine 210 receives a body position mesh 212 and a nozzle mesh 214. The body position mesh 212 is a 3D mesh of interconnected triangles that digitally represents the 3D target body portion 170. The nozzle mesh 214 is a 3D mesh of interconnected triangles that digitally represents the 3D extruder nozzle 180. In alternate embodiments, the body position mesh 212 and the nozzle mesh 214 may conform to any 3D modeling format as known in the art. For instance, in some embodiments, the body position mesh 212 may capture unit normal and vertices that define the target body portion 170 in the stereolithograpy format.

The body position mesh 212 and the nozzle mesh 214 may be generated and transmitted to the synchronization engine 210 in any technically feasible fashion. For instance, in some embodiments, the computer system 110 may include conventional computer aided design (CAD) software, and the body position mesh 212 and the nozzle mesh 214 may be received from the conventional CAD software. Alternatively, a 3D scanner may analyze the target body portion 170 and the extruder nozzle 180 to create, respectively, the body position mesh 212 and the nozzle mesh 214.

In general, the synchronization engine 210 continuously and dynamically rigs the body position mesh 212 to the target body portion 170, and the nozzle mesh 212 to the extruder nozzle 180 based on the tracking data 150. To align the body position mesh 212 to the tracking data 150, the synchronization engine 210 translates the body position mesh 212 from a known offset to the position and orientation of the target marker set as specified in the tracking data 170. Similarly, to align the nozzle mesh 214 to the tracking data 150, the synchronization engine 210 translates the nozzle mesh 214 from a known offset to the position and orientation of the extruder market set as specified in the tracking data 150.

As shown, while the extruder mode 182 is equal to "input," the synchronization engine 210 processes the design input the designer traces on the target body 170 via the tip of the extruder nozzle 180. The design input is included in the tracking data 150 and is specified in world coordinates. The synchronization engine 210 computes relative design data 220 that comprises coordinates that are relative to the target body portion 170 based on the tracking data 150, the body position mesh 212, and the nozzle mesh 214. The synchronization engine 210 may compute the relative design data 220 in any technically feasible fashion.

For instance, in some embodiments, the synchronization engine 210 computes the world coordinates corresponding to the tip of the extruder nozzle 180 based on the tracking data 150. The synchronization engine 210 then performs sampling and smoothing operations to generate filtered coordinates. The synchronization engine 210 attaches the filtered coordinates to the body position mesh 212 to generate the relative design data 220. Because the relative design data 220 maintains the design input relative to any position and orientation of the target body portion 170, the customer may move the target body portion 170 freely without perturbing the design of the wearable object.

The beautification engine 230 receives the relative design data 220 and generates design geometry 240 based on the relative design data 220. More specifically, the beautification engine 230 performs any number and type of pattern matching operations that attempt to approximately match the relative design data 220 to predetermined shapes. For example, if the designer sketches a circular shape on the target body portion 170, then the beautification engine 230 could approximately match the relative design data 220 to an ideal circle. If the beautification engine 230 determines that the relative design data 220 approximately matches a predetermined shape, the beautification engine 230 generates the design geometry 240 based on the idealized shape.

If, however, the beautification engine 230 determines that the relative design data 220 does not approximately match any of the predetermined shapes, then the beautification engine 230 generates the design geometry 240 based on unmodified relative design data 220. The beautification engine 230 may generate the design geometry 240 in any technically feasible fashion and may represent the design geometry 240 in any digital format.

The toolpath generator 250 receives the design geometry 240 and generates the toolpaths 160 based on the design geometry. The toolpath generator 250 may generate the toolpaths 160 in any technically feasible fashion. For instance, in some embodiments, the toolpath generator 250 samples points in the design geometry 240 and then interpolates the sampled points to generate smooth 3-degree spline curves. In alternate embodiments, the wearable object engine 130 may generate the toolpaths 150 based on the relative design data 220 instead of the design geometry 240. In such embodiments, the wearable object engine 130 may not include the beautification engine 230 and/or the design geometry 240.

Irrespective of the extruder mode 182, the wearable object engine 130 continuously implements motion tracking operations and projection-mapping operations. Together, the motion tracking operations and projection-mapping operations maintain a persistent rendering of the design of the wearable object relative to the moving target body portion 170 as the toolpaths 160. Notably, as the customer moves or rotates the target body portion 170, the wearable object engine 130 ensures that the correct, visible portion of the toolpaths 160 is displayed via the projector 152.

As shown, when the extruder mode 182 is equal to "input," the wearable object engine 130 generates visual feedback 172 based on the toolpaths 160 and the position and orientation of the target body portion 170. The visual feedback 172 includes image data that, when projected by the projector 152 onto the target body portion 170, displays the visible portions of the toolpaths 160 at any given point in time. Consequently, the designer and the customer receive continuous, visible feedback that depicts the progress of the design of the wearable object relative to the target body portion 170. The wearable object engine 130 may compute the visual feedback 172 in any technically feasible fashion.

By contrast, when the extruder mode 182 is equal to "output," the guidance engine 270 generates visual guidance 174 based on the toolpaths 160, the position and orientation of the target body portion 170, and the position and orientation of the extruder nozzle 180. The visual guidance 174 includes image data that, when projected by the projector 152 onto the target body portion 170, displays the visible portions of the toolpaths 160 as well as guidance information. The guidance information may be any type of information that facilitates fabricating the wearable object based on tracing the toolpaths 160.

For instance, in some embodiments, if the tip of the extruder nozzle 180 is within a predetermined distance of the toolpaths 160, then the guidance engine 270 computes a "halo" (not shown in FIG. 2) around the tip of the extruder nozzle 180. The guidance engine 270 computes the halo as a circle of minimum diameter that encompasses both the tip of the extruder nozzle 180 and the nearest point included in the toolpaths 280. The guidance engine 270 includes the halo in the visual guidance 174. Because the halo visually depicts any disparity between the tip of the extruder nozzle 180 and the toolpaths 160, the halo visually prompts the user to adjust the position of the extruder nozzle 180. In this fashion, the halo indirectly improves the quality of the fabricated wearable object.

In various embodiments, the guidance engine 270 dynamically animates the line thickness and/or color gradient included in the image data that depicts the visible portions of the toolpaths 160. The guidance engine 270 may animate the lines representing the toolpaths 160 in any technically feasible fashion based on any amount and type of data. For example, the guidance engine 270 may vary the thickness and brightness of the lines representing the toolpaths 280 based on the distance of the toolpaths 280 relative to the tip of the extruder nozzle 180. More specifically, the guidance engine 270 may generate image data that displays lines that are closer to the tip of the extruder nozzle 180 as thicker and brighter than lines that are further from the tip of the extruder nozzle 180. Further, the guidance engine 270 may reduce the thickness and or brightness of a given line as the line progresses from a visible portion of the target body portion 170 towards a non-visible portion of the target body portion 170.

In various embodiments, when the extruder mode 182 is equal to "output," the guidance engine 270 may track the locations of the tip of the extruder nozzle 180 over time to determine the portions of the toolpaths 160 that the designer has fabricated. To provide additional guidance to the designer, the guidance engine 270 may omit the fabricated portions of the toolpaths 160 from the visual guidance 174. Accordingly, as the designer traces the toolpaths 160 via the tip of the extruder nozzle 180, the visual guidance 174 continually prompts the designer to fabricate the unfabricated portions of the wearable object. In alternate embodiments, the guidance engine 270 may generate any amount and type of visual feedback and/or guidance that depicts the progress of the fabrication of the wearable object relative to the target body portion 170.

In an alternate "import" design flow that is depicted with a dashed line, the wearable object engine 130 is configured to import an input mesh 280 that represents an existing design of the wearable object. In the import design flow, the wearable object engine 130 performs read operations on the input mesh 280 and generates the toolpaths 160 based on the input mesh 280 instead of the tracking data 150. The wearable object engine 130 may generate the toolpaths 160 in any technically feasible fashion. In some embodiments, the wearable object engine 130 receives the input mesh 280 and generates the design geometry 240 based on the input mesh 280. The toolpath generator 250 then generates the toolpaths 160 based on the design geometry 240. In other embodiments, the wearable object engine 130 generates the toolpaths 160 based on the input mesh 280 without generating the design geometry 240.

The wearable object engine 130 may be configured to import the input mesh 280 in any technically feasible fashion. For example, the wearable object engine 130 could receive an "import" command via a graphical user interface (GUI). The input mesh 280 is a 3D mesh of interconnected triangles that digitally represents the wearable object. In alternate embodiments, the input mesh 280 may conform to any 3D modeling format as known in the art. The designer may provide the input mesh 280 in any technically feasible fashion. For instance, in some embodiments, the designer generates the input mesh 280 via a conventional CAD application and the CAD application transmits the input mesh 280 to the wearable object engine 130.

In an alternate "export" design flow that is depicted with a dashed line, the wearable object engine 130 is configured to export an output mesh 290. In the export design flow, the wearable object engine 130 computes the union of the toolpaths 160. The wearable object engine 130 then generates geometry with a predetermined thickness based on the toolpaths 160. Subsequently, the wearable object engine 130 generates a 3D interconnected mesh based on the generated geometry. Finally, the wearable object engine 130 performs write operations that store the 3D interconnected mesh in a memory (e.g., the system memory 126) as the output mesh 290. Accordingly, the output mesh 290 archives the design of the wearable object in a form that may be easily adapted, shared, and reproduced.

The wearable object engine 130 may be configured to export the output mesh 290 in any technically feasible fashion. For example, the wearable object engine 130 could receive an "export" command via a GUI. In alternate embodiments, the wearable object engine 130 may be configured to generate and export the output mesh 290 in any technically feasible fashion. Further, the output mesh 290 may conform to any 3D modeling format as known in the art.

In general, the wearable object engine 130 can be configured to generate the toolpaths 160 associated with a design of a given wearable object based on either the tracking data 150 or the input mesh 280. Subsequently, the wearable object engine 130 can be configured to provide visual guidance 174 based on the toolpaths 150 while the designer fabricates the wearable object. Further, instead of or in addition to generating the visual guidance 174, the wearable object engine 130 can generate the output mesh 290 that represents the design of the wearable object. Consequently, the wearable object engine 130 can be configured to automate a variety of different workflows for wearable objects.

For instance, in an on-body workflow, the wearable object engine 130 generates the toolpaths 160 and the visual feedback 172 while the designer sketches the design of the wearable object directly on the target body portion 170. Subsequently, the wearable object engine 130 provides the visual guidance 174 while the designer fabricates the wearable object directly on the target body portion 170. In a CAD to body workflow, the wearable object engine 130 generates the toolpaths 150 based on the input mesh 280 that is received from a conventional CAD tool. The wearable object engine 130 then provides the visual guidance 174 while the designer generates the wearable object directly on the target body portion 170. In a body to CNC workflow, the wearable object engine 130 generates the toolpaths 160 and the visual feedback 172 based on the tracking data 150 while the designer sketches the wearable object directly on the target body portion 170. Subsequently, the wearable object engine 130 generates the output mesh 290 for fabrication via a conventional CNC fabrication tool.

Exemplary Tracking Area and Hand-Held Extruder Nozzle

Figure 3:
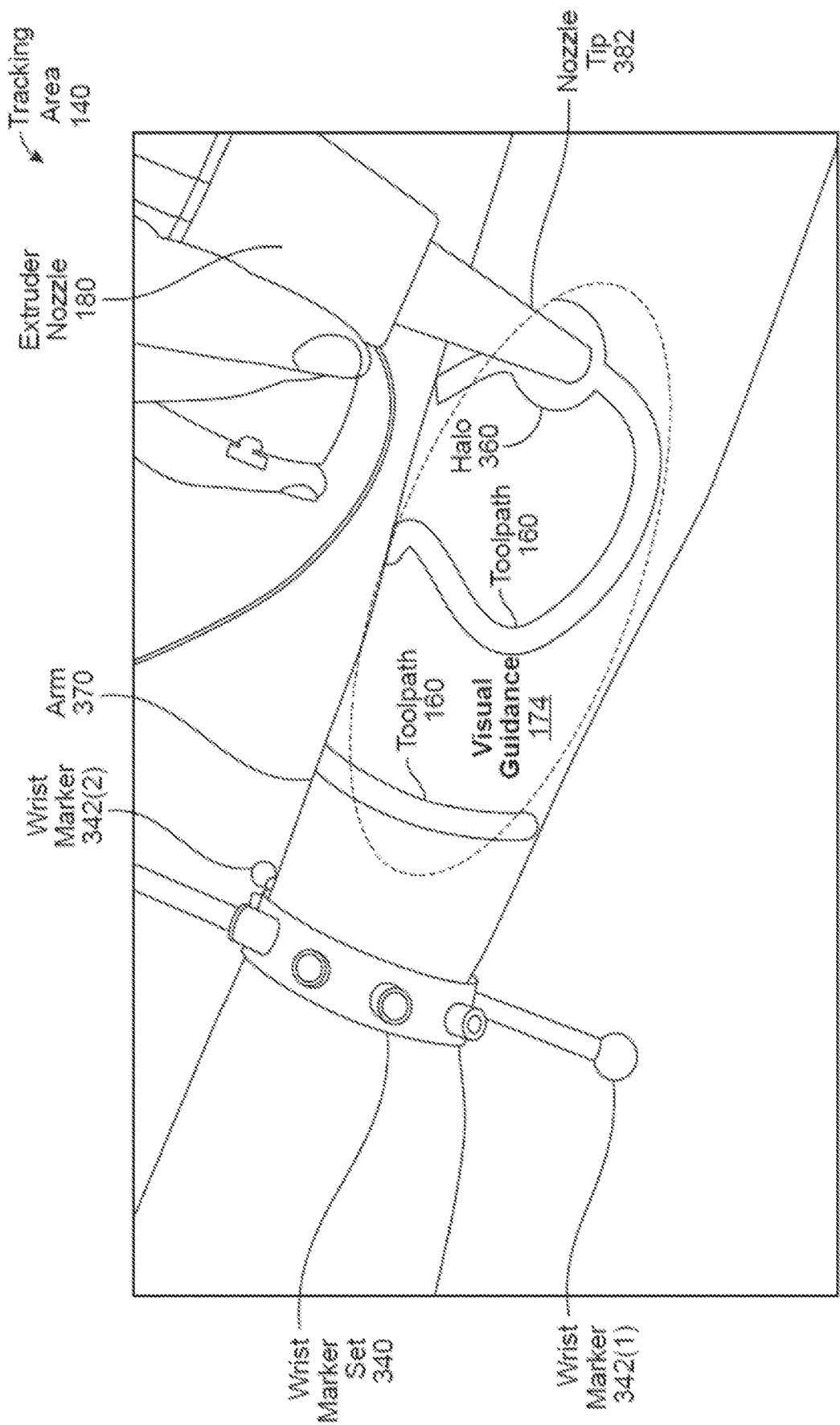
FIG. 3 is a more detailed illustration of the tracking area of FIG. 1, according to various embodiments of the present invention.

FIG. 3 is a more detailed illustration of the tracking area 140 of FIG. 1, according to various embodiments of the present invention. For explanatory purposes only, the target body portion 170 comprises an arm 370 that is situated in the tracking area 140, and the target marker set comprises a wrist marker set 340 that encircles the wrist of the arm 370. The output button located on the extruder nozzle 180 is active and, consequently, the extruder mode 182 is equal to "output."

As shown, the wrist marker set 370 includes wrist markers 342. Although not shown in FIG. 3, an extruder marker set that includes extruder markers is attached to the extruder nozzle 180. The cameras 154 track the motions of the wrist markers 342 and the extruder markers, and transmit the corresponding motion tracking information to the wearable object engine 130 as the tracking data 150.

Because the extruder mode 182 is equal to "output," the guidance engine 270 generates the visual guidance 174 and causes the projector 152 to project the visual guidance 174 directly on the arm 370. As shown, the visual guidance 174 visually depicts portions of the toolpaths 160 that represent a wearable object. Further, the visual guidance 174 visually depicts a halo 360 based on the location of a nozzle tip 382 that is attached to the extruder nozzle 180. As described previously in conjunction with FIG. 2, the halo 360 depicts a discrepancy between the current position of the nozzle tip 282 and the closest position included in the toolpaths 160.

Figure 4:
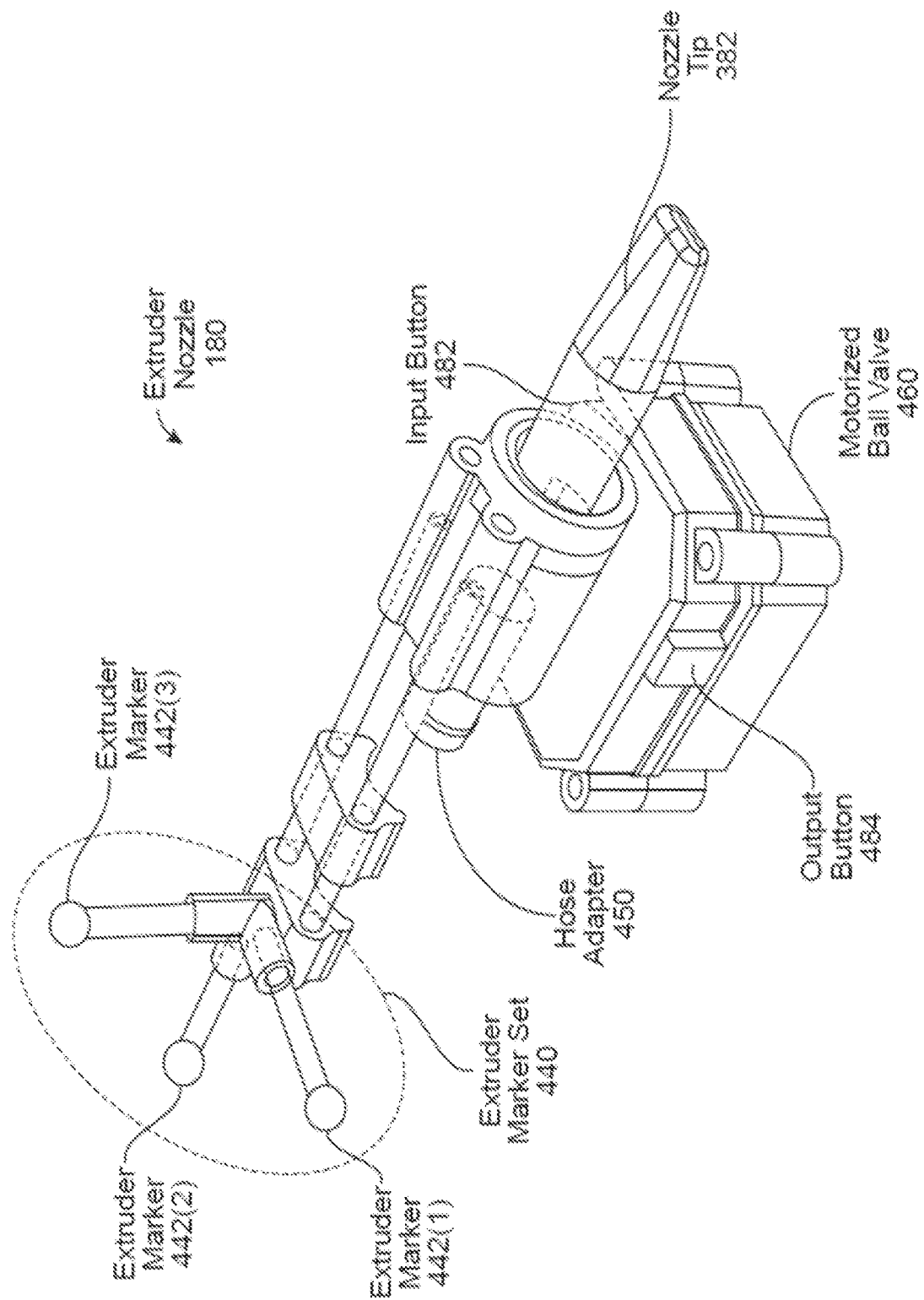
FIG. 4 is a more detailed illustration of the extruder nozzle of FIG. 3, according to various embodiments of the present invention.

FIG. 4 is a more detailed illustration of the extruder nozzle 180 of FIG. 3, according to various embodiments of the present invention. As shown, the extruder nozzle 180 includes, without limitation, an input button 482, an output button 484, a motorized ball valve 460, a hose adapter 450, and the nozzle tip 382. As also shown, an extruder marker set 440 is attached to the extruder nozzle 180. The extruder marker set 440 includes any number of extruder markers 442. The cameras 154 track the motions of the extruder markers 440 and transmit the corresponding motion tracking information to the wearable object engine 130 as the tracking data 150.

Although not shown, the extruder nozzle 180 is connected to a motorized extruder (e.g., a motorized clay extruder) via a hose and the hose adapter 450. When the output button 484 is activated, the motorized ball valve 460 opens and the nozzle tip 382 extrudes fabrication material. In addition, the extruder nozzle 180 transmits the extruder mode 182 of "output" to the wearable object engine 130. When the output button 484 is not activated, the motorized ball valve 460 closes and the nozzle tip 382 does not extrude fabrication material. Further, when the input button 482 is activated, the extruder nozzle 180 transmits the extruder mode 182 of "input" to the wearable object engine 130.

In alternate embodiments, the extruder nozzle 180 may be implemented in any technically feasible fashion that enables the extruder nozzle 180 to selectively extrude any type of fabrication material and enables the wearable object engine 130 to determine the extruder mode 182. For instance, in some embodiments, the motorized ball valve 460 may be replaced with any controller that controls delivery of the fabrication material to the nozzle tip 382 in an technically feasible fashion. In various embodiments, the input button 424 may be replaced with any type of input selector and the output button 426 may be replaced with any type of output selector.

The nozzle tip 382 may be included in a set of interchangeable nozzle tips 382 that are each designed to extrude the fabrication material in a different manner (e.g., rate, surface air-to-volume ratio, etc). The fabrication material may be any type of material that is skin-safe throughout the fabrication process (e.g., the temperature at the time of extrusion may not exceed an maximum threshold) and is malleable enough to be extruded via the nozzle tip 382. In various embodiments, the fabrication material may satisfy other constraints. For instance, in some embodiments, the fabrication material may be relatively easy to remove and clean as well as resilient to movement and deformation while worn on the target body portion 170.

In some embodiments, the fabrication material is a water-based polymer clay known as Jumping Clay. Jumping Clay is an air-dry clay that cures from liquid to solid at room temperature. When cured, Jumping Clay is lightweight, semi-flexible foam and the surface finish is resistant to cracking as the skin of the target body portion 170 deforms. Cured Surface Clay can be summered in water to return the clay to a paste-like initial state that may be reused.

Generating Wearable Objects

Figure 5:
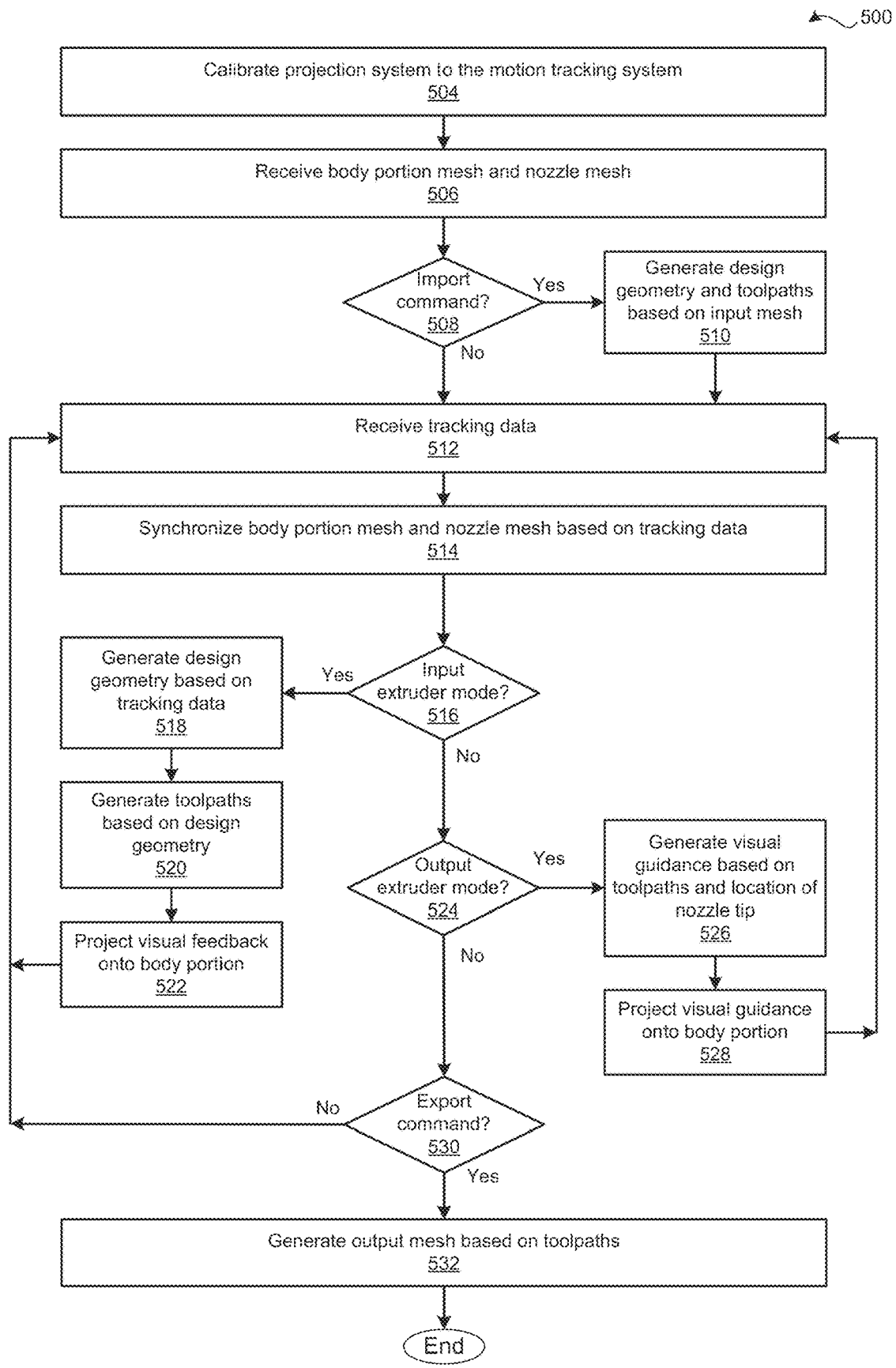
FIG. 5 is a flow diagram of method steps for designing and fabricating wearable objects, according to various embodiments of the present invention.

FIG. 5 is a flow diagram of method steps for designing and fabricating wearable objects, according to various embodiments of the present invention. Although the method steps are described with reference to the systems of FIGS. 1-4, persons skilled in the art will understand that any system configured to implement the method steps, in any order, falls within the scope of the present invention. For explanatory purposes only, the method steps describe the design and fabrication of a wearable object via the extruder nozzle 180. In some alternate embodiments, the extruder nozzle 180 may or may not be hand-held and may or may not be controlled by a human. In other alternate embodiments, the extruder nozzle 180 may be replaced by any type of device or any portion of any type of device that is capable of extruding fabrication material.

As shown, a method 500 begins at step 504, where the wearable object engine 130 calibrates a projection system that include the projector 152 to a motion tracking system that includes the cameras 154. At step 506, the wearable object engine 130 receives the body position mesh 212 and a nozzle mesh 214. The body position mesh 212 is a 3D mesh of interconnected triangles that digitally represents the 3D solid target body portion 170. The nozzle mesh 214 is a 3D mesh of interconnected triangles that digitally represents the 3D extruder nozzle 180.

At step 508, the wearable object engine 130 determines whether the wearable object engine 130 has received an import command. If, at step 508, the wearable object engine 130 determines that the wearable object engine 130 has received an import command, then the wearable object engine 130 proceeds to step 510. At step 510, the wearable object engine 130 performs read operations on the input mesh 280 to generate the design geometry 240. The toolpath generator 250 then generates the toolpaths 160 based on the design geometry 240 and in coordinates that are relative to the target body portion 170. The method 500 then proceeds to step 512. If, however, at step 508, the wearable object engine 130 determines that the wearable object engine 130 has not received an import command, then the method 500 proceeds directly to step 512.

At step 512, the synchronization engine 210 receives the tracking data 150 from the motion tracking system. At step 514, the synchronization engine 210 dynamically rigs the body position mesh 212 and the target body portion 170 based on the tracking data 150. More precisely, the synchronization engine 210 aligns the body position mesh 212 to the target body portion 170 based on the position and orientation of the target marker set that is worn on the target body portion 170 (e.g., the wrist marker set 340). Further, the synchronization engine 210 aligns the nozzle mesh 214 to the extruder nozzle 180 based on the position and orientation of the extruder market set 440.

At step 516, the wearable object engine 130 determines whether the extruder mode 182 is equal to "input." If, at step 516, the wearable object engine 130 determines that the extruder mode 182 is equal to "input," then the method 500 proceeds to step 518. At step 518, the wearable object engine 130 generates the design geometry 240 based on the tracking data 150. First, the synchronization engine 210 computes relative design data 220 based on the tracking data 150. The relative design data 220 comprises coordinates of the nozzle tip 382 that are relative to the target body portion 170. Subsequently, the beautification engine 230 generates design geometry 240 based on the relative design data 220. Notably, the beautification engine 230 replaces imprecise geometries that are defined in the relative design data 220 with corresponding idealized geometries.

At step 520, the toolpath generator 250 generates the toolpaths 160 based on the design geometry 240. The toolpath generator 250 may generate the toolpaths 160 in any technically feasible fashion. For instance, in some embodiments, the toolpath generator 250 samples the design geometry 240 and then interpolates the sampled points to generate smooth 3-degree spline curves. In some alternate embodiments, the wearable object engine 130 may not include the beautification engine 230 and the toolpath generator 260 may generate the toolpaths 150 based directly on the tracking data 150 and/or the relative design data 220 instead of the design geometry 240.

At step 522, the wearable object engine 130 generates the visual feedback 172 and causes the projector 152 to display the visual feedback on the target body portion 170. The wearable object engine 130 generates the visual feedback 172 based on the toolpaths 160 and the position and orientation of the target body portion 170. The visual feedback 172 includes image data that, when projected by the projector 152 onto the target body portion 170, displays the visible portions of the toolpaths 160 at a given point in time. The method 500 then returns to step 512, where the wearable object engine 130 receives new tracking data 150.

If, however, at step 516, the wearable object engine 130 determines that the extruder mode 182 is not equal to "input," then the method 500 proceeds directly to step 524. At step 524, the wearable object engine 130 determines whether the extruder mode 182 is equal to "output." If, at step 524, the wearable object engine 130 determines that the extruder mode 182 is equal to "output," then the method 500 proceeds to step 526.

At step 526, the guidance engine 270 generates the visual guidance 174 based on the toolpaths 150 and the location of the nozzle tip 382. The visual guidance 174 includes image data that, when projected by the projector 152 onto the target body portion 170, displays the visible and unfabricated portions of the wearable object as well as the halo 360 that indicates the current position of the nozzle tip 382. At step 528, the wearable object engine 130 causes the projector 152 to display the visual guidance 174 directly on the target body portion 170. The method 500 then returns to step 512, where the wearable object engine 130 receives new tracking data 150.

If, however, at step 524, the wearable object engine 130 determines that the extruder mode 182 is not equal to "output," then the method 500 proceeds directly to step 530. At step 530, the wearable object engine 130 determines whether the wearable object engine 130 has received an export command. If, at step 530, the wearable object engine 130 determines that the wearable object engine 130 has not received an export command, then the wearable object engine 130 returns to step 512, where the wearable object engine 130 receives new tracking data 150.

If, however, at step 530, the wearable object engine 130 determines that the wearable object engine 130 has received an export command, then the wearable object engine 130 proceeds to step 532. At step 532, the wearable object engine 130 performs write operations that generate an output mesh 290 based on the toolpaths 160. The output mesh 290 comprises 3D interconnected triangles that digitally represent the design of the wearable object. In alternate embodiments, the output mesh 280 may conform to any 3D modeling format as known in the art. The method 500 then terminates.

In sum, the disclosed techniques may be used to design and fabricate wearable objects on human bodies. An on-body fabrication system includes, without limitation, a tracking area, a wearable object engine, a hand-held extruder nozzle, and a target portion of a human body. The tracking area includes a motion tracking system and a projection system. In general, the wearable object engine continually receives tracking data from the motion tracking system. The wearable object engine computes the location and orientation of the extruder nozzle and the location and orientation of the target portion of the human body based on the tracking data.

When the extruder nozzle is operating in an input mode, the designer sketches a design on the target portion of the human body via a tip of the extruder nozzle. As the designer sketches, the wearable object engine generates design geometry based on the tracking data. The wearable object engine computes toolpaths based on the design geometry, and configures the projection system to display the toolpaths directly on the target portion of the human body to provide visual feedback to the designer. By contrast, when the extruder nozzle is operating in an output mode, the extruder nozzle extrudes fabrication material. The wearable object engine generates visual guidance and configures the projection system to display the visual guidance directly on the target portion of the human body. The visual guidance includes visible portions of the toolpaths and a halo that indicates the current location of a tip of the extruder nozzle relative to the toolpaths. As the designer traces the toolpaths with the tip of the extruder nozzle, the extruded fabrication material forms the wearable object and the wearable object engine updates the visual guidance.

Advantageously, because the wearable object engine represents the wearable object digitally, the wearable object engine may import and/or export the toolpaths as a 3D mesh. Consequently, the design of the wearable object may be easily adapted, archived, shared, and reproduced via computer automated design (CAD) tools and/or Computer-Numeric Control (CNC) machines. Reusing a design may dramatically reduce the time required to generate multiple similar wearable objects compared to the time required to generate the wearable objects via conventional, primarily handcrafted design and fabrication approaches. Further, unlike conventional automated CNC design flows, because the designer interacts directly with the target portion of the customer (who may also be the designer), the designer can exert complete artistic control over the wearable object. Accordingly, the designer can ensure that the wearable object meets design and artistic objectives while providing a direct and satisfying customer experience.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating wearable objects, the method comprising:
computing a toolpath based, at least in part, on a design of a three-dimensional (3D) wearable object that is to be placed on a portion of a human body, wherein the design of the 3D wearable object is generated by tracking a motion of a nozzle that is manipulated over the portion of the human body;
generating first visual guidance based on the toolpath, a first configuration associated with the nozzle, and a second configuration associated with the portion of the human body; and
causing the first visual guidance to be projected onto the portion of the human body to indicate how to move the nozzle relative to the portion of the human body to fabricate at least a first portion of the 3D wearable object.

2. The computer-implemented method of claim 1, further comprising:
determining that the portion of the human body has moved to a third configuration;
generating second visual guidance based on the toolpath, the first configuration, and the third configuration; and
causing the second visual guidance to be displayed on the portion of the human body to indicate how to move the nozzle relative to the portion of the human body to fabricate at least a second portion of the wearable object.

3. The computer-implemented method of claim 1, wherein generating the first visual guidance comprises:
computing a current fabrication location based on the first configuration and the second configuration;
generating image data that depicts an unfabricated portion of the 3D wearable object based on the current fabrication location and the toolpath.

4. The computer-implemented method of claim 1, wherein generating the first visual guidance comprises:
computing a current fabrication location based on the first configuration and the second configuration;
determining a closest toolpath location based on the current fabrication location and the toolpath;
generating a circle that encompasses both the closest toolpath location and the current fabrication location; and
generating image data that depicts the circle.

5. The computer-implemented method of claim 1, further comprising:
determining that the nozzle is operating in an input mode;
at a first time, computing first input coordinates based on a third configuration associated with the nozzle and a fourth configuration associated with the portion of the human body; and
generating the design of the 3D wearable object based on a plurality of input coordinates that includes the first input coordinates.

6. The computer-implemented method of claim 1, further comprising:
determining that a plurality of input coordinates specify an input shape that approximately matches a predefined shape; and
generating the design of the 3D wearable object based on the predefined shape and the plurality of input coordinates.

7. The computer-implemented method of claim 1, further comprising generating a three-dimensional model of the 3D wearable object based on the toolpath, and performing one or more write operations to store the three-dimensional model in a memory.

8. The computer-implemented method of claim 1, wherein the toolpath is computed further based on a 3D mesh that represents the portion of the human body.

9. The computer-implemented method of claim 1, wherein the toolpath is computed further based on a 3D mesh that represents the nozzle.

10. One or more non-transitory computer-readable media including instructions that, when executed by one or more processors, cause the one or more processors to generate wearable objects by performing the steps of:
computing a toolpath based, at least in part, on a design of a three-dimensional (3D) wearable object that is to be placed on a portion of a human body, wherein the design of the 3D wearable object is generated by tracking a motion of a nozzle that is manipulated over the portion of the human body;
generating first visual guidance based on the toolpath, a first configuration associated with the nozzle, and a second configuration associated with the portion of the human body; and
causing the first visual guidance to be projected onto the portion of the human body to indicate how to move the nozzle relative to the portion of the human body to fabricate at least a first portion of the 3D wearable object.

11. The one or more non-transitory computer-readable media of claim 10, further comprising:
determining that the portion of the human body has moved to a third configuration;
generating second visual guidance based on the toolpath, the first configuration, and the third configuration; and
causing the second visual guidance to be displayed on the portion of the human body to indicate how to move the nozzle relative to the portion of the human body to fabricate at least a second portion of the 3D wearable object.

12. The one or more non-transitory computer-readable media of claim 10, wherein generating the first visual guidance comprises:
computing a current fabrication location based on the first configuration and the second configuration;
generating image data that depicts an unfabricated portion of the 3D wearable object based on the current fabrication location and the toolpath.

13. The one or more non-transitory computer-readable media of claim 10, wherein generating the first visual guidance comprises:
computing a current fabrication location based on the first configuration and the second configuration;
determining a closest toolpath location based on the current fabrication location and the toolpath;
generating a circle that encompasses both the closest toolpath location and the current fabrication location; and
generating image data that depicts the circle.

14. The one or more non-transitory computer-readable media of claim 10, further comprising:
determining that the nozzle is operating in an input mode;
at a first time, computing first input coordinates based on a third configuration associated with the nozzle and a fourth configuration associated with the portion of the human body; and
generating the design of the 3D wearable object based on a plurality of input coordinates that includes the first input coordinates.

15. The one or more non-transitory computer-readable media of claim 10, further comprising generating a three-dimensional model of the 3D wearable object based on the toolpath, and performing one or more write operations to store the three-dimensional model in a memory.

16. The one or more non-transitory computer-readable media of claim 10, further comprising determining the first configuration based on tracking data that is associated with the nozzle, and determining the second configuration based on tracking data that is associated with the portion of the human body.

17. The one or more non-transitory computer-readable media of claim 16, wherein the tracking data that is associated with the nozzle and the tracking data that is associated with the portion of the human body are received from a motion tracking system that includes one or more cameras.

* * * * *